(12) United States Patent
Hsueh et al.

(10) Patent No.: US 7,463,466 B2
(45) Date of Patent: Dec. 9, 2008

(54) INTEGRATED CIRCUIT WITH ESD PROTECTION CIRCUIT

(75) Inventors: Kuey-Lung Kelvin Hsueh, Milpitas, CA (US); Ming-Jing Ho, Hsinchu (TW)

(73) Assignee: United Microelectronics Corp., Hsinchu (TW)

( * ) Notice: Subject to any disclaimer, the term of this patent is extended or adjusted under 35 U.S.C. 154(b) by 304 days.

(21) Appl. No.: 11/163,571

(22) Filed: Oct. 24, 2005

(65) Prior Publication Data

US 2007/0091521 A1 Apr. 26, 2007

(51) Int. Cl.
*H02H 9/00* (2006.01)

(52) U.S. Cl. ............ 361/56; 361/91.1; 361/111

(58) Field of Classification Search ......... 361/56, 361/91.1, 111; 257/355
See application file for complete search history.

(56) References Cited

U.S. PATENT DOCUMENTS

| | | | | |
|---|---|---|---|---|
| 5,652,689 | A | 7/1997 | Yuan | 361/56 |
| 5,654,862 | A * | 8/1997 | Worley et al. | 361/111 |
| 5,963,409 | A * | 10/1999 | Chang | 361/56 |
| 6,072,219 | A | 6/2000 | Ker et al. | 257/355 |
| 6,144,542 | A * | 11/2000 | Ker et al. | 361/111 |
| 6,157,065 | A | 12/2000 | Huang et al. | 257/355 |
| 6,465,768 | B1 | 10/2002 | Ker et al. | 250/214.1 |
| 6,603,177 | B2 | 8/2003 | Tang et al. | 257/355 |
| 6,646,840 | B1 * | 11/2003 | Sugerman et al. | 361/56 |
| 6,867,461 | B1 | 3/2005 | Ker et al. | 257/360 |
| 2005/0286186 | A1 * | 12/2005 | Chang | 361/56 |

OTHER PUBLICATIONS

Article titled "Substrate-Triggered ESD Protection Circuit Without Extra Process Modification", jointly authored by Ker et al., IEEE Journal of Solid-State Circuits, vol. 38, No. 2. Feb. 2003, pp. 295-302.
Article titled "A Fail-Safe ESD Protection Circuit with 23D IF Linear Capacitance for High-Speed/High-Precision 0.18 μm CMOS I/O Application" jointly authored by Lin et al., IEDM Journal, vol. 13, No. 6, 2002 pp. 349-352.
Article titled "Substrate Pump NMOS for ESD Protection Applications" jointly authored by Duvvury et al., EOS/ESD Symposium, vol. 1A, No. 2.1-2.11, pp. 00.7-00.17.

* cited by examiner

*Primary Examiner*—Michael J Sherry
*Assistant Examiner*—Terrence R Willoughby
(74) *Attorney, Agent, or Firm*—Jianq Chyun IP Office

(57) ABSTRACT

An integrated circuit (IC) having an electrostatic discharge (ESD) protection circuit therein is provided. The IC comprises a plurality of bonding pads, a plurality of ESD units, a first ESD bus and a second ESD bus. The first ESD bus has no direct connection with any power pad of the IC. Each ESD unit comprises a first diode, a second diode and an ESD clamping device. Due to the one-to-one correspondent of each bonding pad with an ESD unit, the present invention ensures ESD continuity through a continuous charge dissipation path no matter what kind of pin-to-pin ESD test the IC is undergoing or how many power sources the IC has. In addition, a bonding pad over active circuitry (BOAC) structure can also be deployed in the present invention to provide a better ESD protection for the whole IC chip.

23 Claims, 8 Drawing Sheets

INTEGRATED CIRCUIT WITH ESD PROTECTION CIRCUIT

BACKGROUND OF THE INVENTION

1. Field of the Invention

The present invention relates to an electrostatic discharge (ESD) protection circuit. More particularly, the present invention relates to an integrated circuit with ESD protection circuit fabricated using deep sub-micron complementary metal-oxide-semiconductor (CMOS) technique.

2. Description of the Related Art

In the process of fabricating or assembling an integrated circuit (IC), electrostatic discharge (ESD) is often a critical factor leading to irreversible damages to the IC. At present, electrostatic discharge is one of the major causes of damage in the fabrication of deep sub-micron IC. To combat the problems resulting from ESD, on-chip ESD protection circuits are added to the input/output (I/O) pads of IC such as the complementary metal-oxide-semiconductor (CMOS) integrated circuit. However, the protective function of ESD protection circuits has seen quite a significant drop in its effectiveness with the rapid development of IC fabrication process. Hence, how to boost the effectiveness of ESD protection circuit is now a common goal in the electronics industry.

A number of ESD protection circuits has been proposed for protecting integrated circuits. For example, Charvaka Duvvury, S. Ramaswamy, A. Amerasekera, R. A. Cline, B. H. Anderson, and V. Gupta et. Al have issued an article called "Substrate Pump NMOS for ESD Protection Application", PP7-17 in EOS/ESD Symposium, 2000. In it, a gate coupling NMOS ESD protection circuit has been proposed. However, this circuit does not have a pad-to-VDD ESD protection plan. Moreover, the input capacitor is non-uniform when the pad voltage changes. To address the input capacitor non-uniformity problem, Jerry Lin, C. Duvvury, B. Haroun, I. Oguzman, & A.Somoyalji et al have issued an article called "A Fail-Safe ESD Protection Circuit with 230 fF Linear Capacitance for High-Speed/High-precision 0.18 CMOS I/O Application", PP 349-352 in IEEE IEDM, December 2002. Thus, an improved gate coupling NMOS ESD protection circuit has been developed. Yet, the design still has no specific arrangement for providing pad-to-VDD ESD protection.

To give more examples, Tung-Yang Chen & M. Ker have issued an article called "Substrate-Triggered ESD Protection Circuit without Extra Process Modification", PP 295-501 in IEEE Journal of Solid-State Circuits, Vol. 38, No. 2, 2003. In the article, a substrate-triggered ESD protection circuit has been proposed. Thus, the feasibility of using a substrate bias to increase the ESD threshold value has been verified. In U.S. Pat. No. 6,072,219 and U.S. Pat. No. 6,465,768, some actual improvements or improved substrate-triggered ESD protection devices have been proposed. In others, such as the U.S. Pat. No. 5,652,689, U.S. Pat. No. 6,157,065 and U.S. Pat. No. 6,603,177, a number of structures having an ESD protection circuit formed underneath the bonding pad have been proposed. Furthermore, in U.S. Pat. No. 6,867,461, an ESD protection circuit that can be applied to an integrated circuit with power-down mode has been proposed.

Nevertheless, a pin-to-pin discharge sometimes occurs. That is, one particular pin may serve as a positive node while another pin may serve as a negative node so that an ESD zapping signal is added to the bonding pads of the positive and negative node. Due to the indirect ESD dissipation path in many conventional design techniques, only a weaker ESD threshold value can be provided. Furthermore, some of the integrated circuits may have a multiple of power sources. Since the multiple power sources are in separated and non-connected areas, an electrostatic discharge through a continuous charge dissipation path may be destroyed. Ultimately, an even worse ESD threshold value is obtained.

SUMMARY OF THE INVENTION

Accordingly, at least one objective of the present invention is to provide an integrated circuit (IC) with electrostatic discharge (ESD) protection circuit having a whole IC chip ESD protection function. Furthermore, under the condition of a pin-to-pin discharge condition or an IC having a multiple power sources, the present invention can still provide continuity in the ESD through a direct and continuous ESD path so that an optimal ESD threshold value is obtained. Moreover, in the self-aligned silicide complementary metal-oxide-semiconductor (CMOS) process used in the fabrication of the IC, there is no need to position a blocking mask.

To achieve these and other advantages and in accordance with the purpose of the invention, as embodied and broadly described herein, the invention provides an integrated circuit (IC) with an electrostatic discharge (ESD) protection circuit therein. The IC includes a plurality of bonding pads, a plurality of ESD units, a first ESD bus, and a second ESD bus. The bonding pads include at least an input/output (I/O) pad and at least a power pad. Each ESD unit has a one-to-one correspondent with a bonding pad. Each ESD unit comprises a first diode, a second diode and an ESD clamping device. The ESD clamping device has a first terminal and a second terminal. When there is an electrostatic impulse between the first terminal and the second terminal, the ESD clamping device will transfer the electrostatic charges from the first terminal to the second terminal. The connections of each ESD unit within the IC are as follows. The anode of the first diode is connected to a corresponding bonding pad of the ESD unit and the cathode of the first diode is connected to the first terminal of the ESD clamping device. The cathode of the second diode is connected to a corresponding bonding pad of the ESD unit and the anode of the second diode is connected to the second terminal of the ESD unit. The first ESD bus is connected to the cathode of first diode of all the ESD units and the second ESD bus is connected to the anode of the second diode of all the ESD units. Most important of all, the first ESD bus has no direct connection with any one of the power pads of the IC.

According to the IC with ESD protection circuit in the embodiment of the present invention, the bonding pads includes a first power pad. When the IC operates, the first power pad is connected to the power source having the highest voltage inside the IC. The IC further includes a first metal-oxide-semiconductor (MOS) transistor for fixing the voltage of the first ESD bus. A first source/drain of the first MOS transistor is coupled to the first ESD bus and a second source/drain of the first MOS transistor is coupled to the first power pad. If the first MOS transistor is a P-type metal-oxide-semiconductor (PMOS) transistor, the gate is connected to a ground. Preferably, the IC includes a third diode having an anode coupled to the first ESD bus and a cathode coupled to the first power pad.

According to the IC with ESD protection circuit in the embodiment of the present invention, the IC further includes a first ground-connected power pad. The first ground-connected power pad is directly connected to the second ESD bus. Preferably, the bonding pads include a second ground-connected power pad. The second ground-connected power pad is connected to the first ground-connected power pad through at least a diode.

According to the IC with ESD protection circuit in another embodiment of the present invention, the second ESD bus has no direct connection with any one of the power pads inside the IC. Preferably, the boding pads include at least one second power pad. When the IC operates, the second power pad is connected to the power source having the lowest voltage inside the IC. The IC further includes a second metal-oxide-semiconductor (MOS) transistor for fixing the voltage in the second ESD bus. A first source/drain of the second MOS transistor is coupled to the second ESD bus and a second source/drain of the second MOS transistor is coupled to the second power pad. More preferably, the IC further includes a fourth diode having a cathode coupled to the second ESD bus and an anode coupled to the second power pad.

The present invention also provides an alternative integrated circuit (IC) with an electrostatic discharge (ESD) protection circuit. The IC includes a plurality of bonding pads, a plurality of ESD units, a first ESD bus and a second ESD bus. The bonding pads include at least an input/output (I/O) pad and at least a power pad. Each ESD unit has a one-to-one correspondent with a bonding pad. Each ESD unit comprises a first diode, a second diode, and an ESD clamping device. The ESD clamping device has a first terminal and a second terminal. When there is an electrostatic discharge impulse between the first terminal and the second terminal, the ESD clamping device will transfer the electrostatic charges from the first terminal to the second terminal. The connections of each ESD unit within the IC are as follows. The anode of the first is connected to the bonding pad of a corresponding ESD unit and the cathode of the first diode is connected to the first terminal of the ESD clamping device. The cathode of the second diode is connected to a corresponding bonding pad of the ESD unit and the anode of the second diode is connected to the second terminal of the ESD clamping device. The first ESD bus is connected to the cathode of the first diode of all the ESD units and the second ESD bus is connected to the anode of the second diode of all the ESD units. Most important of all, the second ESD bus has no direct connection with any one of the power pads of the IC.

According to the IC with ESD protection circuit in yet another embodiment of the present invention, the bonding pads includes a negative power pad. When the IC operates, the negative power pad is connected to the power source having the lowest voltage inside the IC. The IC further includes a MOS transistor for fixing the voltage of the second ESD bus. A first source/drain of the MOS transistor is coupled to the second ESD bus and a second source/drain of the MOS transistor is coupled to the negative power source. Preferably, the IC further includes a third diode having a cathode coupled to the second ESD bus and an anode coupled to the negative power source. Moreover, the IC may further include a positive power source. The positive power source is directly connected to the first ESD bus.

According to the IC with ESD protection circuit in all the embodiments of the present invention, each ESD unit can be disposed under a corresponding bonding pad. Preferably, the ESD units are formed underneath all the input/output pads and power source pads within the IC. This kind of ESD circuit arrangement is often said to have a bonding pad over active circuitry (BOAC) structure. More preferably, the ESD clamping device underneath the bonding pads is enclosed by a ground-connected N-well to strengthen the power of the ESD clamping device. In addition, if there is a need to connect with the output driver inside the IC, the output driver can be connected to one of the input/output pads of the bonding pads through a N+ diffusion resistor.

According to the IC with ESD protection circuit in all the embodiments of the present invention, the ESD clamping device can be a substrate-triggered ESD protection circuit, a gate coupling ESD protection circuit or a gate grounded ESD protection circuit. Furthermore, the substrate-triggered ESD protection circuit can be a P-type MOS substrate-triggered ESD protection circuit or an N-type MOS substrate-triggered ESD protection circuit.

Since the present invention deploys the foregoing structure, or better still, the BOAC structure, a continuous ESD path is provided so that the ESD energy can pass through the whole IC chip and protect the whole IC chip against ESD. Furthermore, with the energy of the ESD zapping signal distributed to a large number of ESD clamping devices, each ESD unit can be fabricated using a self-aligned silicide (Salicide) CMOS process. Hence, there is no need to dispose a blocking mask in the Salicide CMOS process.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
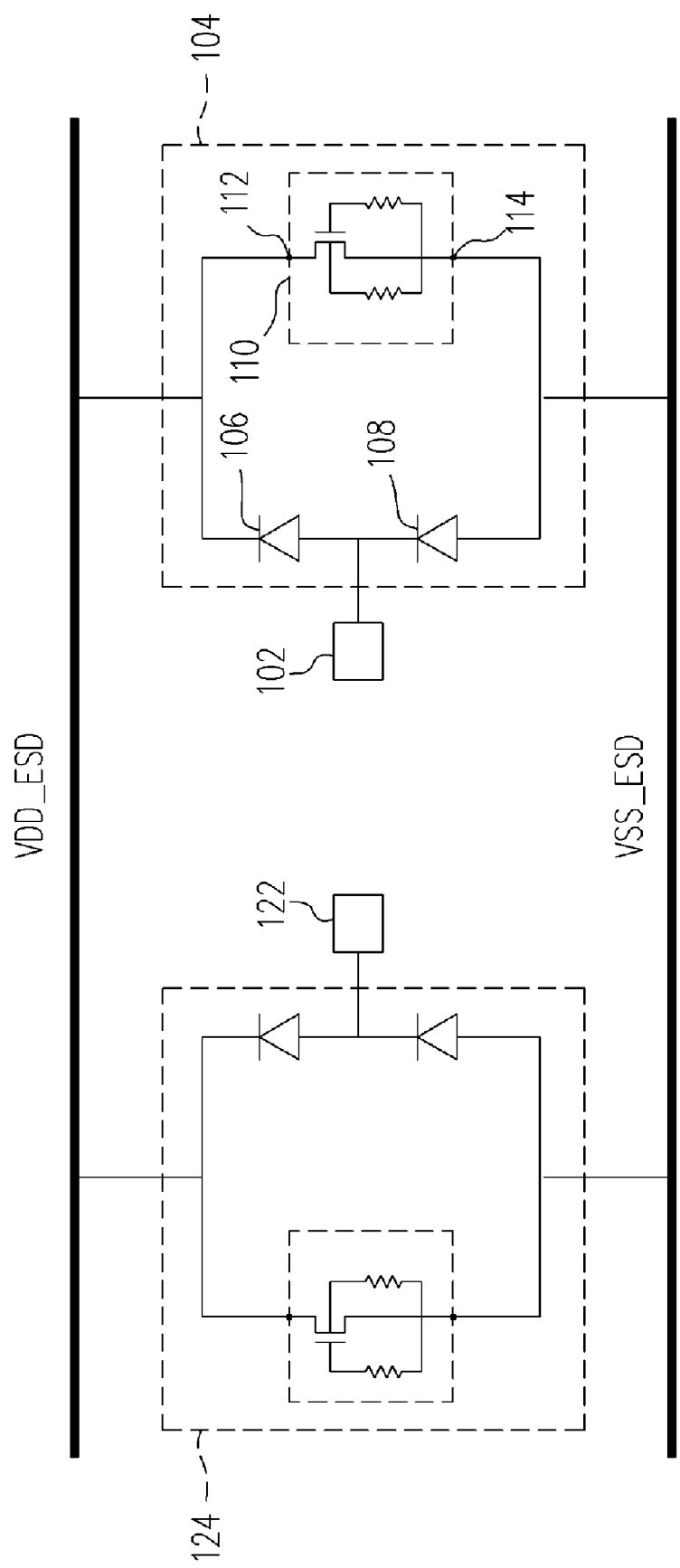
FIG. 1 is a circuit diagram of an ESD unit and corresponding bonding pads according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The solution provided by the electrostatic discharge (ESD) protection circuit in the present invention does not target a particular unit cell or a particular circuit block. Instead, the ESD protection circuit of the present invention aims to protect the whole IC chip against any ESD. Therefore, all or most of the bonding pads within the IC has a one-to-one correspondence with an ESD unit. FIG. 1 is a circuit diagram of an ESD unit and corresponding bonding pads according to one embodiment of the present invention. As shown in FIG. 1, the bonding pads 102 and 122 can be input/output (I/O) pads or power pads within the IC. The bonding pads 102 and 122 have a one-to-one correspondence with their respective ESD units 104 and 124. For example, the ESD unit 104 includes a first diode 106, a second diode 108 and an ESD clamping device 110. The ESD clamping device 110 has a first terminal 112 and a second terminal 114, which are the external terminals of the ESD clamping device 110. The anode of the first diode 106 is coupled to the bonding pad 102 and the cathode of the first diode 106 is connected to the first terminal 112 of the ESD clamping device 110. The cathode of the second diode 108 is connected to the bonding pad 102 and the anode of the second diode 108 is connected to the second terminal 114 of the ESD clamping device 110. When there is an electrostatic discharge impulse between the first terminal 112 and the second terminal 114 of the ESD clamping device 110, that is, when the first terminal 112 serves as a positive node and the second terminal 114 serves a negative node and a positive ESD zapping impulse is introduced at a point somewhere between the positive and the negative node, the ESD clamping device 110 will transfer the electrostatic charges from the first terminal 112 to the second terminal 114. In other words, the ESD current and energy will flow through the ESD clamping device 110 and achieve the ESD voltage clamping function. It should be noted that the first terminal of all these ESD units 104, 124 and so on are connected to a first ESD bus VDD_ESD while the second terminal of all these ESD units 104, 124 and so on are connected to a second ESD bus VSS_ESD. In FIG. 1, a gate grounded ESD protection circuit is used an actual embodiment. Obviously, the present invention is not limited as such. Other types of ESD protection circuits are also possible. These other ESD protection circuits are shown with reference to FIGS. 2A to 2D.

Figure 2A:
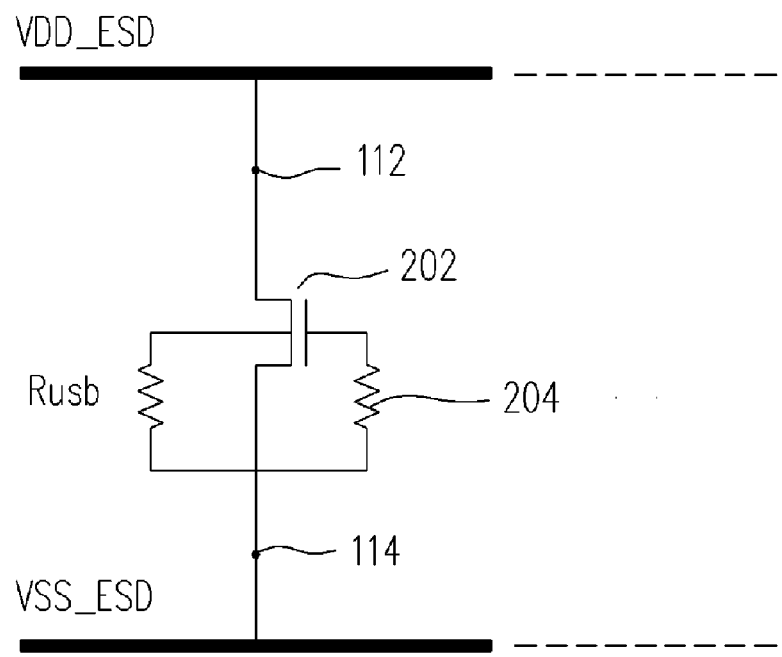
FIGS. 2A through 2D are the diagrams of circuits used in the ESD clamping device of FIG. 1.

FIGS. 2A through 2D are the diagrams of circuits used in the ESD clamping device of FIG. 1. First, as shown in FIG. 2A, the ESD clamping device is a gate-grounded NMOS (MESD for short) circuit. The MESD circuit comprises an equivalent substrate resistor $R_{sub}$, an NMOS transistor 202 and a gate resistor 204. Superficially, there is nothing particular about the design because it is similar to the conventional technique. The ESD withstanding capacity of the MESD circuit is still limited by the size of the MESD device. However, if all or most of the bonding pads within the IC chip have this type of MESD circuit, neighboring MESD can take up some of the ESD charges if any one of the bonding pads is subjected to the impulse of an ESD zapping signal. Consequently, the total strength of the IC for withstanding an ESD will increase significantly. Obviously, the aforementioned ESD clamping device 110 is a gate-grounded ESD protection circuit such as the MESD circuit shown in FIG. 2A. However, this should by no means limit the scope of the present invention. The ESD clamping device 110 can also be a substrate-triggered ESD protection circuit, a gate coupling ESD protection circuit or other conventional ESD protection circuits. Moreover, the substrate-triggered ESD protection circuit can be a P-type MOS (PMOS) substrate-triggered ESD protection circuit or an N-type MOS (NMOS) substrate-triggered ESD protection circuit.

Figure 2B:
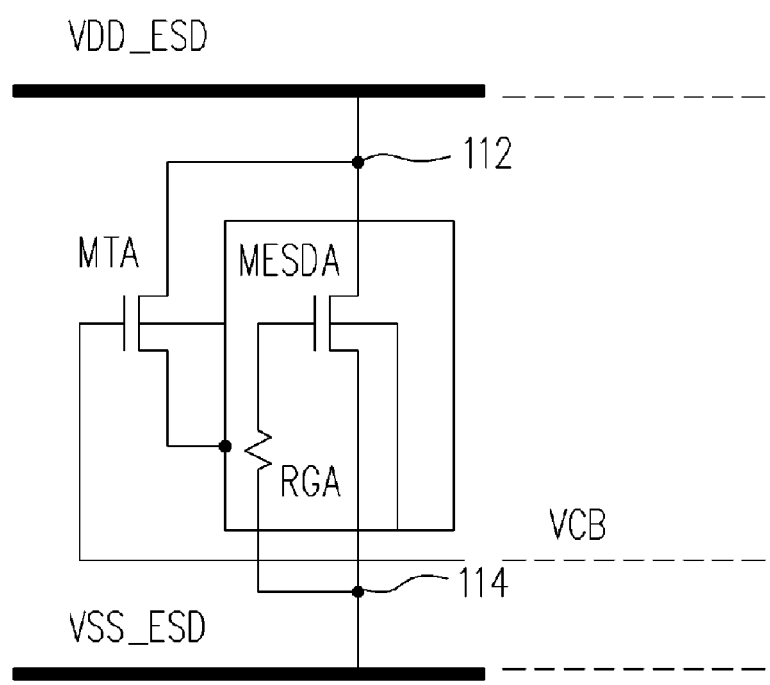
Figure 2C:
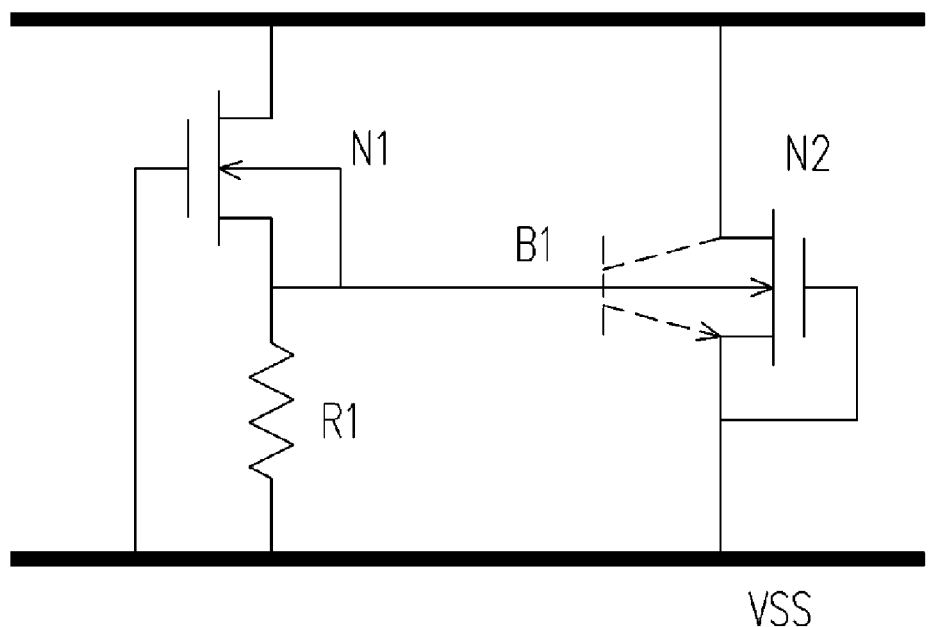
Figure 2D:
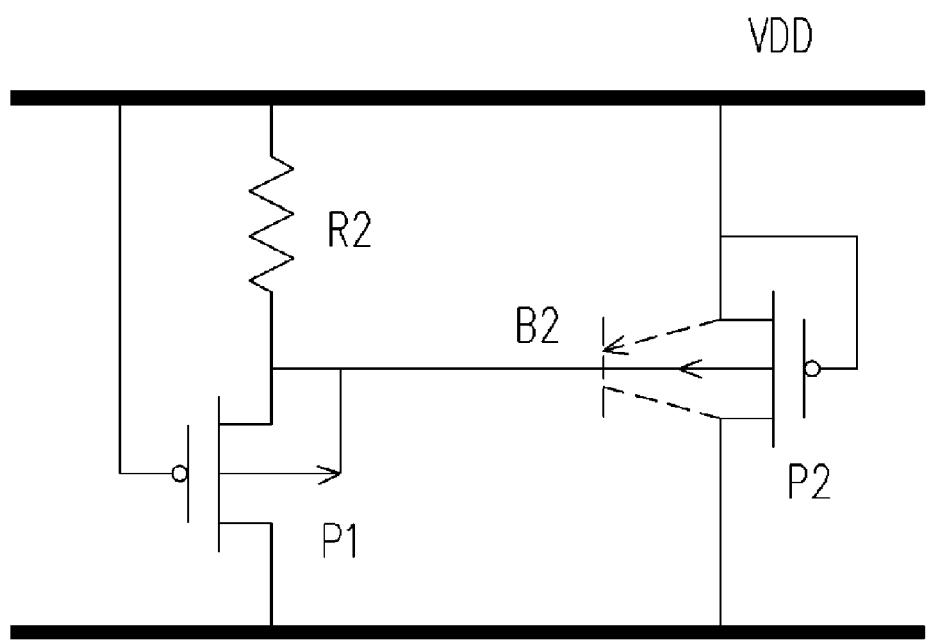

As shown in FIG. 2B, the ESD clamping device is a type of substrate-triggered NMOS ESD protection circuit comprising two NMOS transistors MESDA and MTA, and a resistor RGA. Here, the operating principles of the circuit system will not be described in detail. As shown in FIG. 2C, the ESD clamping device is another type of substrate-triggered NMOS ESD protection circuit comprising two NMOS transistors N1 and N2, a resistor R1 and an equivalent transistor B1 formed naturally through its layout structure. Here, the operating principles of the circuit system will not be described in detail. As shown in FIG. 2D, the ESD clamping device is a type of substrate-triggered PMOS ESD protection circuit comprising two PMOS transistors P1 and P2, a resistor R2 and an equivalent transistor B2 formed naturally through its layout structure. Here, the operating principles of the circuit system will not be described in detail.

Figure 3A:
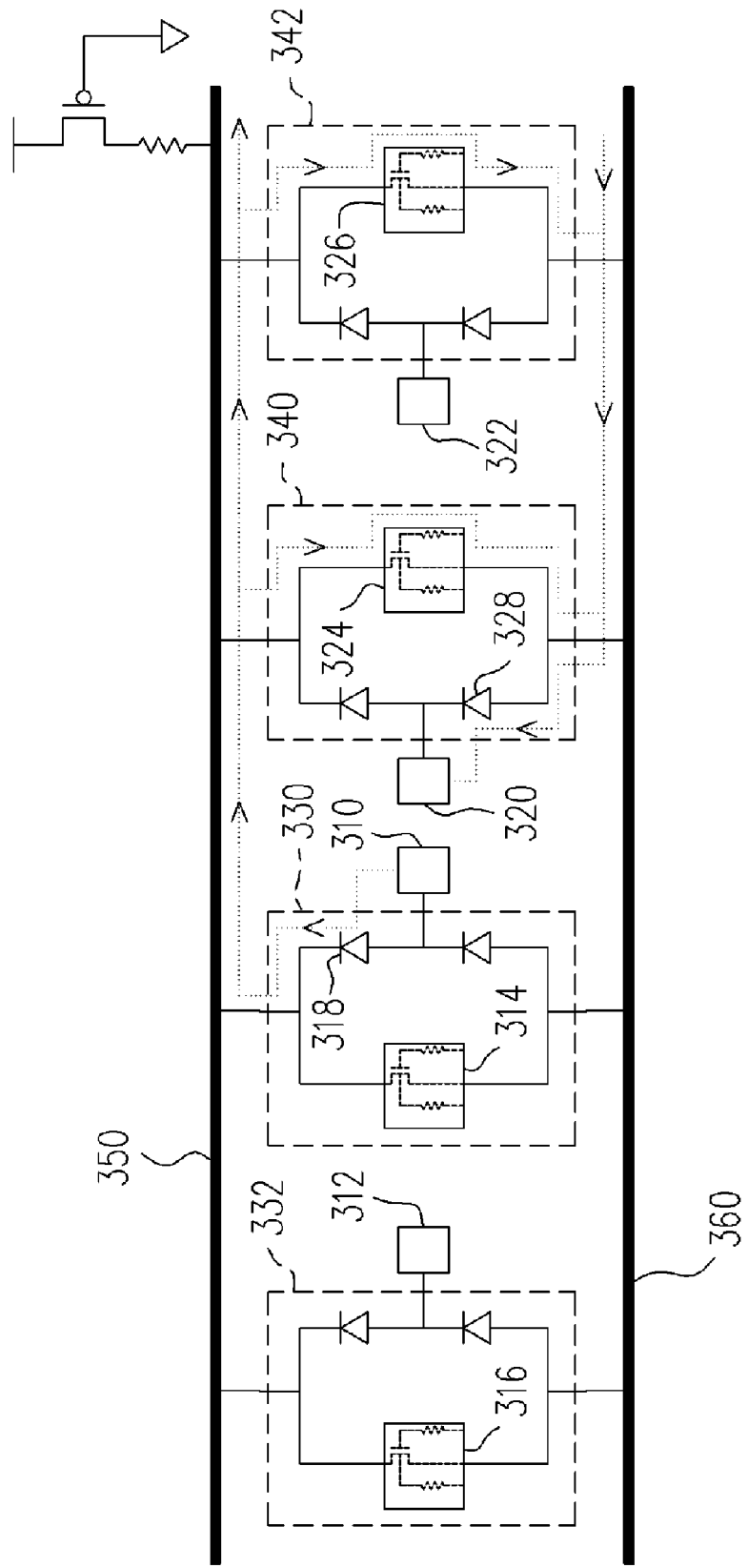
FIGS. 3A and 3B are circuit diagrams showing the flow of electrostatic charges through a continuous ESD path according to the embodiment of the present invention under a pin-to-pin ESD testing mode.
Figure 3B:
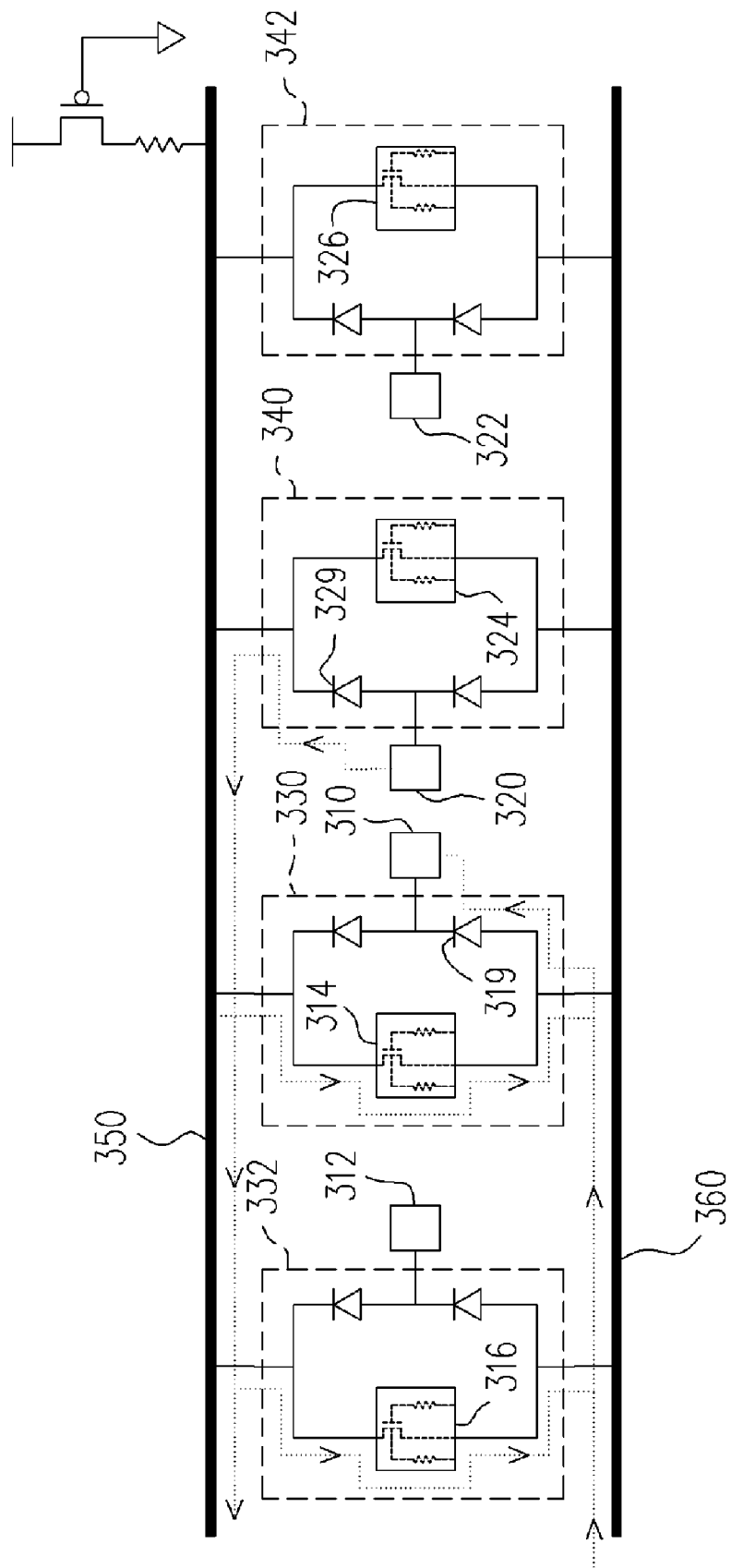

FIGS. 3A and 3B are circuit diagrams showing the flow of electrostatic charges through a continuous ESD path according to the embodiment of the present invention under a pin-to-pin ESD testing mode. First, as shown in FIG. 3A, the present invention provides an integrated circuit (IC) with an ESD protection circuit comprising at least a plurality of bonding pads 310, 312, 320, 322, . . . , a plurality of ESD units 330, 332, 340, 342, . . . having a one-to-one correspondence with the bonding pads, a first ESD bus 350 and a second ESD bus 360. The first ESD bus 350 is connected to the first terminal of all the ESD units 330, 332, 340, 342, . . . , that is, the cathode of the first diode inside the respective ESD units 330, 332, 340, 342, . . . and so on. Similarly, the second ESD bus 360 is connected to the second terminal of the ESD units 330, 332, 340, 342, . . . , that is, the anode of the second diode inside the respective ESD units 330, 332, 340, 342, . . . and so on. Furthermore, these bonding pads 310, 312, 320, 322, . . . and so on include a plurality of input/output pads and at least one power pad. If the IC has a plurality of power sources, these bonding pads also include all the power pads having a different voltage source. Here, the MESD device shown in FIG. 2A is an example of the ESD clamping device inside the ESD units 330, 332, 340, 342, . . . and so on. However, this should by no means limit the scope of the ESD clamping device in the present invention.

There are 4 typical ESD modes for testing the integrated circuit:

1. The PS mode ESD testing includes applying a positive ESD zapping impulse at one particular bonding pad such as a 2 KV of steeply rising positive voltage impulse signal with the ground power pad or the VSS power pad connected to the ground. Furthermore, the other voltage power pads or the VDD power pads are set to a floating state.

2. The NS mode ESD testing includes applying a negative ESD zapping impulse at one particular bonding pad such as a 2 KV of steeply dropping negative voltage impulse signal with the ground power pads or the VSS power pads connected to the ground. Furthermore, the other voltage power pads or the VDD power pads are set to a floating state.

3. The PD mode ESD testing includes applying a positive ESD zapping impulse at one particular bonding pad such as a 2 KV of steeply rising positive voltage impulse signal with the other voltage power pads or the VDD power pads connected to the ground. Furthermore, the ground power pads or the VSS power pads are set to a floating state.

4. The ND mode ESD testing includes applying a negative ESD zapping impulse at one particular bonding pad such as a 2 KV of steeply dropping negative voltage impulse signal with the other voltage power pads or the VDD power pads connected to the ground. Furthermore, the ground power pads or the VSS power pads are set to a floating state.

Beside the aforementioned four modes of ESD testing, the present invention also allows a pin-to-pin mode of ESD testing. In other words, a positive or negative ESD zapping impulse such as a 2 KV of steeply rising positive voltage or steeply falling negative voltage pulse signal is applied to the bonding pad of a particular pin while the bonding pad of another pin is connected to a ground. All the other voltage power pads or VDD power pads as well as all the ground power pads or VSS power pads are set to a floating state. In fact, the aforementioned 4 ESD testing modes can be regarded as 4 special cases of the pin-to-pin ESD testing. That is, the other voltage power pads or VDD power pads can be regarded as another ground-connected bonding pads in the pin-to-pin ESD testing (PD and ND mode). Similarly, the ground power pads or the VSS power pads can be regarded as another ground-connected bonding pads in the pin-to-pin ESD testing (PS and NS mode). Therefore, the present invention can utilize the testing conditions obtained from the pin-to-pin mode of ESD testing to interpret all ESD testing results.

As shown in FIG. 3A, if the bonding pad 320 is connected to a ground and a positive ESD zapping pulse is applied to the bonding pad 310, then an electrostatic charge current will pass through the first diode 318 inside the ESD unit 330 corresponding to the bonding pad 310 and flow to the ESD unit 340 corresponding to the bonding pad 320 and all the neighboring ESD units 342, . . . via the first ESD bus 350. Through the ESD clamping devices 324, 326, . . . inside these ESD units 340, 342, . . . , the ESD current and energy is transferred to the second ESD bus 360. Finally, through the second diode 328 inside the ESD unit 340 corresponding to the bonding pad 320, the ESD current returns to the ground-connected bonding pad 320. Hence, a direct and continuous pathway for ESD is established and an effective protection against ESD is provided.

As shown in FIG. 3B, if the bonding pad 320 is connected to a ground and a negative ESD zapping pulse is applied to the bonding pad 310, then an electrostatic charge current will pass through the first diode 329 inside the ESD unit 340 corresponding to the bonding pad 320 and flow to the ESD unit 330 corresponding to the bonding pad 310 and all the neighboring ESD units 332, . . . via the first ESD bus 350. Through the ESD clamping devices 330, 332, . . . inside these ESD units 314, 316, . . . , the ESD current and energy is transferred to the second ESD bus 360. Finally, through the second diode 319 inside the ESD unit 330 corresponding to the bonding pad 310, the negative ESD zapping pulse returns to the bonding pad 310. Hence, a direct and continuous pathway for ESD is established and an effective protection against ESD is provided.

According to the continuous ESD pathway in FIGS. 3A and 3B, the first ESD bus 350 cannot be a direct bus for any one of the voltage sources because the power areas of an integrated circuit with multiple power source are separated from each other. In other words, the operating voltage in various voltage sources is different so that their voltage source bus cannot be directly connected together and need to be separated from each other and non-continuous. Thus, if the first ESD bus 350 is directly the bus of a particular voltage source, the continuity of the ESD pathway may be destroyed. Ultimately, its capacity for protecting the IC chip against an ESD might fail.

Figure 4:
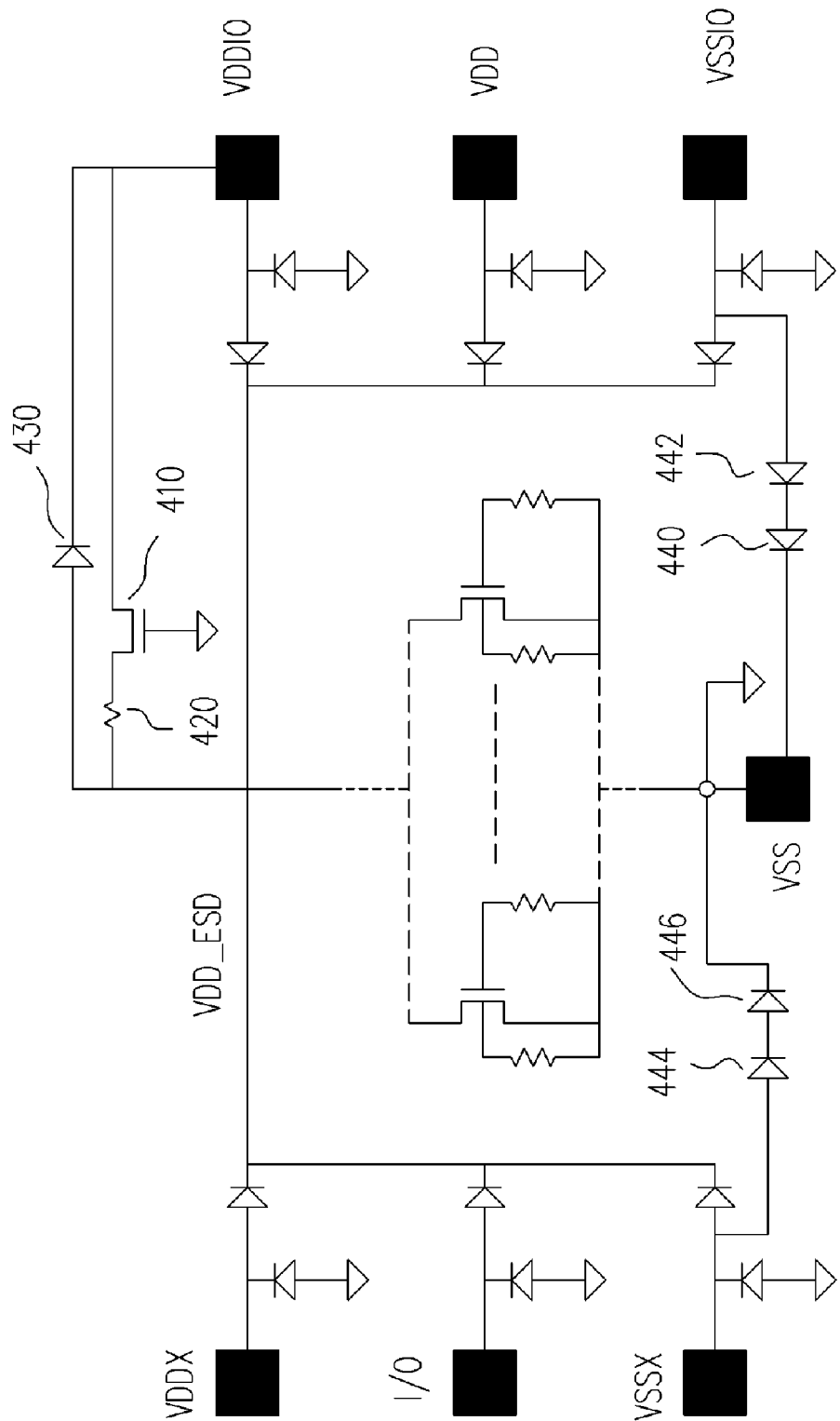
FIG. 4 is a circuit diagram of an IC with an ESD protection circuit according to one embodiment of the present invention.

FIG. 4 is a circuit diagram of an IC with an ESD protection circuit according to one embodiment of the present invention. As shown in FIG. 4, the integrated circuit in the present embodiment is an IC with a multiple of power sources. Hence, the plurality of bonding pads inside the IC includes a plurality of different voltage source power pads VDDIO, VDDX, VDD, an input/output (I/O) pad and a plurality of ground-connected power pads VSSIO, VSSX. Similarly, each bonding pad has a one-to-one correspondence with a ESD unit. Furthermore, each ESD unit inside the IC similarly includes a first diode, a second diode and an ESD clamping device. One major difference is that all the ESD clamping devices are connected in parallel and disposed at a central location in FIG. 4 to symbolize that every one of the neighboring MESD will shoulder some of the charges in the ESD. Obviously, the circuits in FIGS. 2A through 2D can also be used to replace these ESD clamping devices. In addition, the second ESD bus is indicated in FIG. 4 as a ground connection symbol. However, the most important fact is that the first ESD bus VDD_ESD is not directly connected to any one of the power pads inside the integrated circuit.

Because the first ESD bus VDD_ESD is not directly connected to any voltage source, the voltage in the ESD bus VDD_ESD needs to be fixed. Through a first MOS transistor 410 and a resistor 420, the voltage of the first ESD bus VDD_ESD and the highest operating voltage inside the integrated circuit are locked up together. The first MOS transistor 410 is a P-type MOS (PMOS) transistor, for example. The gate of the PMOS transistor is connected to a ground. A first source/drain of the PMOS transistor is coupled to the first ESD bus VDD_ESD and a second source/drain of the PMOS transistor is coupled to the first power pad VDDIO. The resistor 420 can be a resistor formed as a result of the polysilicon wiring layout process. When this integrated circuit (IC) operates, the first power pad VDDIO is connected to power source having the highest voltage inside the IC. In the present embodiment, a third diode 430 can also be used to connect the first ESD bus VDD_ESD and the first power pad VDDIO together. In other words, the anode of the third diode 430 is coupled to the first ESD bus VDD_ESD and the cathode of the third diode 430 is coupled to the first power pad VDDIO. Furthermore, the third diode 430 is deployed to prevent any noise interference between the first power pad VDDIO and the first ESD bus VDD_ESD. The reason for connecting to the highest voltage source power pad VDDIO instead of other lower voltage source power pad VDDX or VDD is that it is inappropriate to operate the IC with many short-circuit-like current loops between power pads connected to different voltage sources such as VDDX, VDD, VDDIO.

As shown in FIG. 4, the integrated circuit in the present embodiment further includes a first ground-connected power pad VSS. The first ground-connected power pad VSS is directly connected to the second ESD bus or directly connected to a ground-connected bus (not shown). The other ground-connected power pads of the IC such as VSSIO and VSSX is connected to the first ground-connected power pad VSS through at least one diode, for example, through two diodes 440 and 442 or another two diodes 444 and 446. The cathode of these diodes faces the first ground-connected power pad VSS. Furthermore, the diodes 440, 442, 444, 446 can be laid underneath the first ground-connected power pad VSS. Under such conditions, there may be some slight changes in the ESD path in a PS or an NS mode of ESD testing. However, anyone familiar with the technique may easily deduce a relationship and hence the details are not described here.

Figure 5:
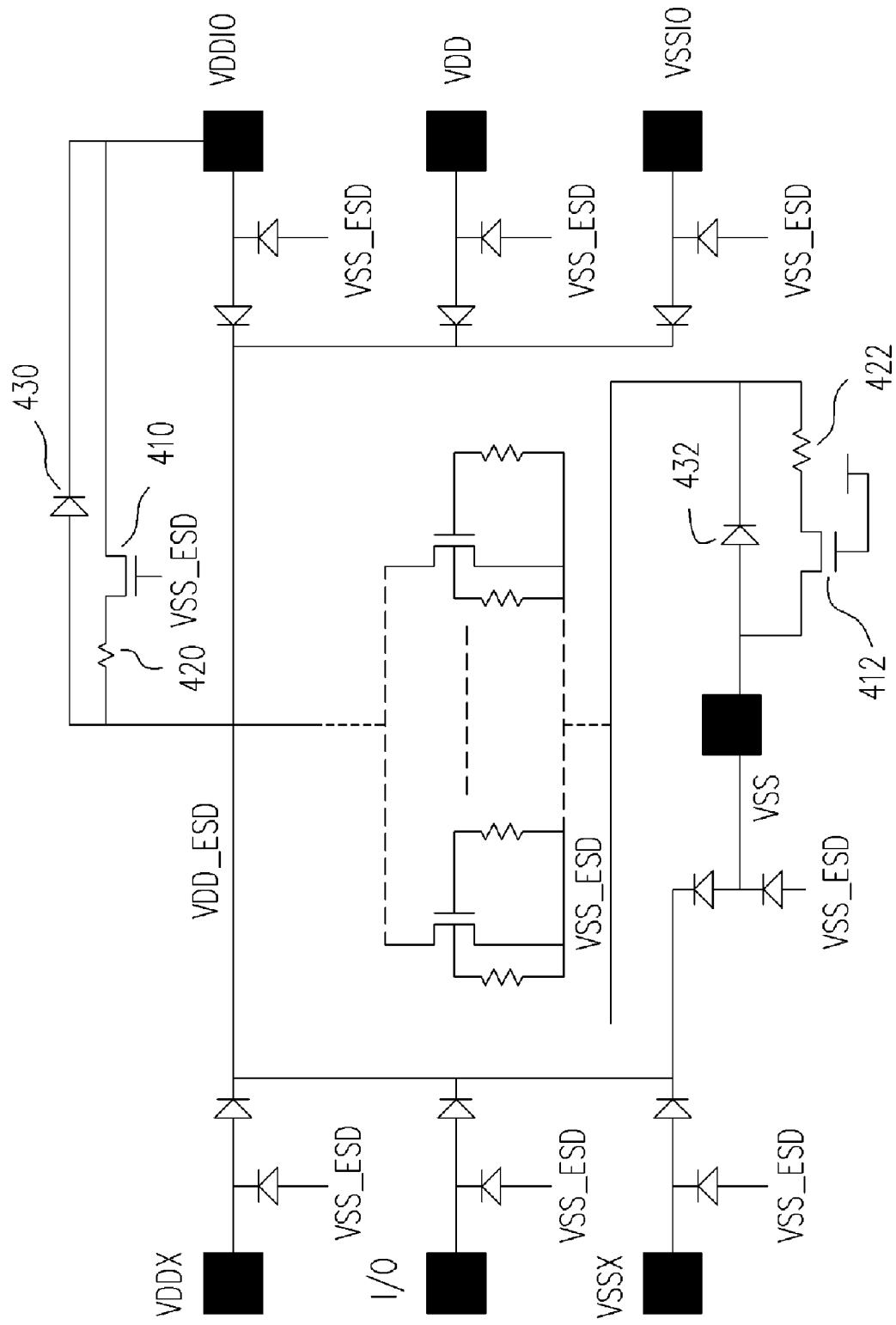
FIG. 5 is a circuit diagram of an IC with an ESD protection circuit according to another embodiment of the present invention.

FIG. 5 is a circuit diagram of an IC with an ESD protection circuit according to another embodiment of the present invention. As shown in FIG. 5, the integrated circuit is mostly similar to the one in FIG. 4. One major difference is that the second ESD bus VSS_ESD is not directly connected to any power pad within the integrated circuit. The power pads VSSIO and VSS are not necessarily ground-connected power pads. Furthermore, the second power pad VSS also has a corresponding ESD unit. When the IC operates, the second power pad is connected to the power source having the lowest voltage inside the integrated circuit, or possibly a ground. Similarly, to fix the voltage of the second ESD bus VSS_ESD, the voltage of the second ESD bus VSS_ESD and the lowest potential of the integrated circuit are locked up together through the second MOS transistor 412 and the resistor 422. In other words, a first source/drain of the second MOS transistor is coupled to the second ESD bus VSS_ESD and a second source/drain of the second MOS transistor 412 is coupled to the second power pad VSS. In FIG. 5, the resistor 422 can be a resistor formed in the process of laying out the polysilicon conductive wires. Similarly, the IC in the present invention may also include a fourth diode 432 having a cathode coupled to the second ESD bus VSS_ESD and an anode coupled to the second power pad VSS.

Figure 6:
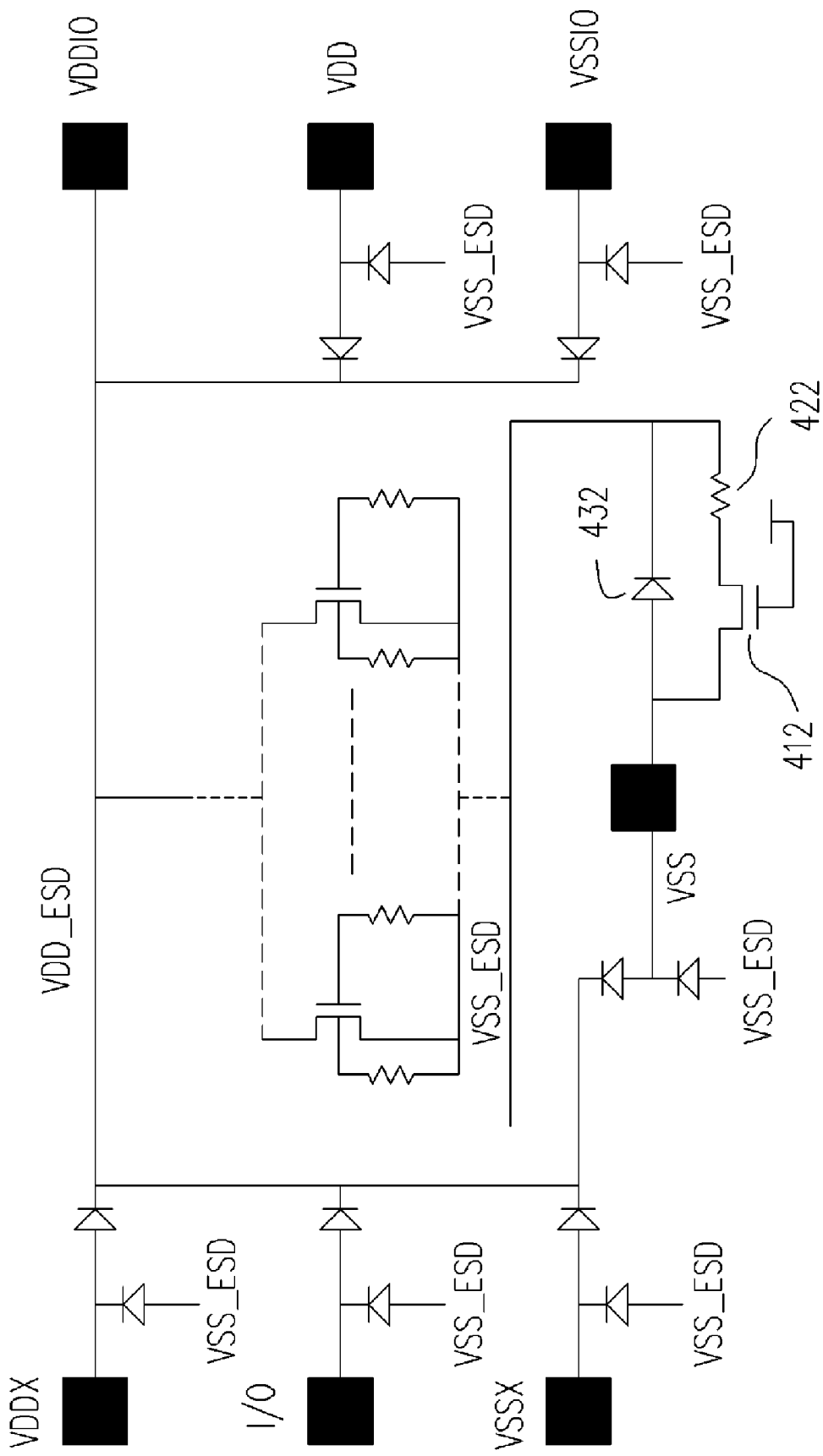
FIG. 6 is a circuit diagram of an IC with an ESD protection circuit according to yet another embodiment of the present invention.

FIG. 6 is a circuit diagram of an IC with an ESD protection circuit according to yet another embodiment of the present invention. As shown in FIG. 6, the integrated circuit is mostly similar to the one in FIG. 5. The second ESD bus is also not directly connected to any power pad inside the IC. However, the first ESD bus VDD_ESD is directly connected to the positive power pad VDD. The positive power pad VDD can be a ground-connected power pad and the power pad VSS of the bonding pads can be a negative power pad. In other words, when the IC operates, the negative power pad is connected to the power source having the lowest voltage inside the IC. Under such conditions, there may be some slight changes in the continuous ESD path in a PD or an ND mode ESD testing. However, anyone familiar with the technique may easily deduce a relationship and hence the details are not described here.

In all of the aforementioned embodiments, each ESD unit can be disposed underneath a corresponding bonding pad. Furthermore, the ESD units can also be disposed in the areas underneath the input/output pads and the power pads inside the integrated circuit to form the so-called 'bonding pad over active circuitry' (BOAC) structure. To increase the strength of the ESD clamping device, the ESD clamping device underneath the bonding pads can be surrounded by a ground-connected N-well. Furthermore, if there is a need to connect to an output driver inside the IC, the output driver can be connected to one of the input/output pads through a N+ diffusion resistor with the N+ diffusion resistor serving as a safety resistor in an electrostatic discharge.

In summary, there is a one-to-one correspondence between each bonding pad and an ESD unit in the present invention. Furthermore, with the deployment of a BOAC structure, a direct and continuous ESD path is always provided even if the ESD is a pin-to-pin discharge or the IC has a multiple of power sources. The energy of the ESD will flow over the whole IC chip and provide a comprehensive ESD protection of the entire chip. Moreover, the energy embedded within the ESD zapping signal can be dispersed among a large number of ESD clamping devices. Hence, each ESD unit can be fabricated using a self-aligned silicide CMOS process only. In other words, there is no need to dispose a blocking mask in the self-aligned silicide CMOS process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An integrated circuit with an electrostatic discharge (ESD) protection circuit therein, comprising:
    a plurality of bonding pads including at least an input/output pad and at least a power pad;
    a plurality of ESD units with each ESD unit having a one-to-one correspondence with one of the bonding pads, and each ESD unit having:
        a first diode, wherein the anode of the first diode is connected to a corresponding bonding pad;
        a second diode, wherein the cathode of the second diode is connected to a corresponding bonding pad; and
        an ESD clamping device having a first terminal and a second terminal, wherein the first terminal is connected to the cathode of the first diode and the second terminal is connected to the anode of the second diode, and when an ESD pulse is applied to a point between the first terminal and the second terminal, the ESD clamping device will transfer the electrostatic charges from the first terminal to the second terminal;
    a first ESD bus connected to the cathode of the first diode in the ESD units, wherein the first ESD bus is not connected to any one of the power pads inside the integrated circuit; and
    a second ESD bus connected to the anode of the second diode in the ESD units, wherein the bonding pads includes a first power pad such that the first power pad is connected to a power source having the highest voltage inside the integrated circuit when the integrated circuit operates, and the integrated circuit further includes a first metal-oxide-semiconductor (MOS) transistor for fixing the voltage in the first ESD bus such that a first source/drain of the first MOS transistor is connected to the first ESD bus and a second source/drain of the first MOS transistor is connected to the first power pad.

2. The integrated circuit of claim 1, wherein the integrated circuit further includes a third diode having an anode coupled to the first ESD bus and a cathode coupled to the first power pad.

3. The integrated circuit of claim 1, wherein the first MOS transistor includes a P-type MOS (PMOS) transistor having a gate connected to a ground.

4. The integrated circuit of claim 1, wherein the second ESD bus is also not directly connected to any one of the power pads inside the integrated circuit.

5. The integrated circuit of claim 4, wherein the bonding pads includes a second power pad such that the second power pad is connected to a power source having the lowest voltage inside the integrated circuit when the integrated circuit operates, and the integrated circuit further includes a second metal-oxide-semiconductor (MOS) transistor for fixing the voltage in the second ESD bus such that a first source/drain of the second MOS transistor is connected to the second ESD bus and a second source/drain of the second MOS transistor is connected to the second power pad.

6. The integrated circuit of claim 5, wherein the integrated circuit further includes a fourth diode having a cathode coupled to the second ESD bus and an anode coupled to the second power pad.

7. The integrated circuit of claim 1, wherein the integrated circuit further includes a first ground-connected power pad such that the first ground-connected power pad is directly connected to the second ESD bus.

8. The integrated circuit of claim 7, wherein the bonding pad includes a second ground-connected power pad such that the second ground-connected power pad is connected to the first ground-connected power pad through at least one diode.

9. The integrated circuit of claim 1, wherein each ESD unit is disposed underneath a corresponding bonding pad.

10. The integrated circuit of claim 9, wherein the ESD clamping device underneath the bonding pad is surrounded by a ground-connected N-well to increase the strength of the ESD clamping device.

11. The integrated circuit of claim 9, wherein the integrated circuit further includes an output driver connected to one of the input/output pads of the bonding pads through an N+ diffusion resistor.

12. The integrated circuit of claim 1, wherein the ESD clamping device includes a substrate-triggered P-type metal-oxide-semiconductor (MOS) ESD protection circuit or a substrate-triggered N-type metal-oxide (MOS) semiconductor ESD protection circuit.

13. The integrated circuit of claim 1, wherein the ESD clamping unit includes a gate coupling ESD protection circuit.

14. The integrated circuit of claim 1, wherein the ESD clamping device includes a gate grounded ESD protection circuit.

15. An integrated circuit with an electrostatic discharge (ESD) protection circuit therein, comprising:
   a plurality of bonding pads including at least one input/output pad and at least one power pad;
   a plurality of ESD units with each ESD unit having a one-to-one correspondence with a bonding pad, each ESD unit having:
      a first diode having an anode connected to a corresponding bonding pad;
      a second diode having a cathode connected to a corresponding bonding pad; and
      an ESD clamping device having a first terminal and a second terminal, wherein the first terminal is connected to the cathode of the first diode and the second terminal is connected to the anode of the second diode, and when an ESD pulse is applied to a point between the first terminal and the second terminal, the ESD clamping device will transfer the electrostatic charges from the first terminal to the second terminal;
   a first ESD bus connected to the cathode of the first diode in the ESD units, wherein the first ESD bus is not connected to any one of the power pads inside the integrated circuit; and
   a second ESD bus connected to the anode of the second diode in the ESD units, wherein the second ESD bus is not directly connected to any one of the power pads inside the integrated circuit, wherein the bonding pads includes a negative power pad such that the negative power pad is connected to a power source having the lowest voltage inside the integrated circuit when the integrated circuit operates, and the integrated circuit further includes a metal-oxide-semiconductor (MOS) transistor for fixing the voltage in the second ESD bus such that a first source/drain of the MOS transistor is connected to the second ESD bus and a second source/drain of the MOS transistor is connected to the negative power pad.

16. The integrated circuit of claim 15, wherein the integrated circuit further includes a third diode having a cathode coupled to the second ESD bus and an anode coupled to the negative power pad.

17. The integrated circuit of claim 15, wherein the integrated circuit further includes a positive power pad directly connected to the first ESD bus.

18. The integrated circuit of claim 15, wherein each ESD unit is disposed underneath a corresponding bonding pad.

19. The integrated circuit of claim 18, wherein the ESD clamping device underneath the bonding pad is surrounded by a ground-connected N-well to increase the strength of the ESD clamping device.

20. The integrated circuit of claim 18, wherein the integrated circuit further includes an output driver connected to one of the input/output pads of the bonding pads through an N+ diffusion resistor.

21. The integrated circuit of claim 15, wherein the ESD clamping device includes a substrate-triggered P-type metal-oxide-semiconductor (MOS) ESD protection circuit or a substrate-triggered N-type metal-oxide (MOS) semiconductor ESD protection circuit.

22. The integrated circuit of claim 15, wherein the ESD clamping unit includes a gate coupling ESD protection circuit.

23. The integrated circuit of claim 15, wherein the ESD clamping device includes a gate grounded ESD protection circuit.

* * * * *